(12) United States Patent
Krasutsky

(10) Patent No.: US 8,284,382 B2
(45) Date of Patent: Oct. 9, 2012

(54) LOOKDOWN AND LOITERING LADAR SYSTEM

(75) Inventor: Nicholas Krasutsky, Carrollton, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/467,118

(22) Filed: May 15, 2009

(65) Prior Publication Data

US 2010/0073664 A1   Mar. 25, 2010

Related U.S. Application Data

(63) Continuation of application No. 11/177,782, filed on Jul. 8, 2005, now abandoned.

(51) Int. Cl.
*G01B 3/00* (2006.01)
(52) U.S. Cl. .............. 356/4.01; 356/3.01; 356/3.15; 356/4.1
(58) Field of Classification Search ........ 356/3.01–3.15, 356/4.01–4.1, 5.01–5.15, 6–22, 28–28.5
See application file for complete search history.

(56) References Cited

U.S. PATENT DOCUMENTS

| | | | |
|---|---|---|---|
| 4,085,910 A | 4/1978 | Baker | 244/3.16 |
| 4,615,587 A | 10/1986 | Krasutsky | 350/353 |
| 4,970,403 A | 11/1990 | Krasutsky | 250/216 |
| 5,200,606 A | 4/1993 | Krasutsky et al. | 250/216 |
| 5,224,109 A | 6/1993 | Krasutsky et al. | 372/29 |
| 5,243,553 A | 9/1993 | Flockencier | 356/5 |
| 5,285,461 A * | 2/1994 | Krasutsky et al. | 250/234 |
| 5,285,761 A | 2/1994 | Hancock et al. | 123/634 |
| 5,898,483 A | 4/1999 | Flowers | 356/4.01 |
| 6,115,113 A | 9/2000 | Flockencier | 356/5.01 |
| 6,184,828 B1 * | 2/2001 | Shoki | 342/372 |
| 6,262,800 B1 | 7/2001 | Minor | 356/139.07 |
| 6,584,382 B2 | 6/2003 | Karem | 701/3 |
| 7,336,345 B2 | 2/2008 | Krasutsky | 356/4.01 |
| 2002/0190162 A1 | 12/2002 | McDonnell | 244/170 |
| 2002/0198632 A1 | 12/2002 | Breed et al. | 701/1 |
| 2004/0012771 A1 | 1/2004 | Ehbets | 356/4.01 |
| 2005/0068517 A1 * | 3/2005 | Evans et al. | 356/5.01 |
| 2006/0124838 A1 | 6/2006 | Baker et al. | 250/221 |
| 2006/0197013 A1 | 9/2006 | Liebman | 250/234 |
| 2006/0197936 A1 | 9/2006 | Liebman | 356/5.01 |
| 2007/0008514 A1 | 1/2007 | Krasutsky | 356/4.01 |
| 2007/0222968 A1 | 9/2007 | Krasutsky | 356/4.01 |
| 2008/0002176 A1 | 1/2008 | Krasutsky | 356/4.01 |

OTHER PUBLICATIONS

Dec. 18, 2007 Search Report for Serial No. PCT/US06/021339.
Feb. 24, 2006 Office Action for U.S. Appl. No. 11/177,782.
Nov. 20, 2006 Final Rejection for U.S. Appl. No. 11/177,782.
Mar. 22, 2007 Examiner's Answer to Appeal Brief for U.S. Appl. No. 11/177,782.

(Continued)

*Primary Examiner* — Thomas Tarcza
*Assistant Examiner* — Luke Ratcliffe
(74) *Attorney, Agent, or Firm* — Lee, Jorgensen, Pyle & Kewalramani, P.C.

(57) ABSTRACT

A LADAR system and with lookdown and loitering capabilities is disclosed. In one aspect, an apparatus includes a LADAR sensor and a gimbal. The LADAR sensor is mounted to the gimbal, which is capable of scanning in azimuth sufficient to provide a look down and loitering capability. In another aspect, a method includes flying an airborne vehicle through an environment; and scanning a LADAR signal forward and to at least one side into a field of regard.

42 Claims, 11 Drawing Sheets

OTHER PUBLICATIONS

Jul. 17, 2007 Examiner's Answer to Appeal Brief for U.S. Appl. No. 11/177,782.
Mar. 16, 2009 Board's Decision Affirmed in Part for U.S. Appl. No. 11/177,782.
Feb. 24, 2006 Non-Final Rejection for U.S. Appl. No. 11/177,458.
Aug. 9, 2006 Election/Restriction Requirement for U.S. Appl. No. 11/177,458.
Nov. 8, 2006 Non-Final Rejection for U.S. Appl. No. 11/177,458.
May 3, 2007 Non-Final Rejection for U.S. Appl. No. 11/177,458.
Oct. 18, 2007 Final Rejection for U.S. Appl. No. 11/177,458.
Jan. 4, 2008 Non-Final Rejection for U.S. Appl. No. 11/177,458.
Jun. 25, 2008 Final Rejection for U.S. Appl. No. 11/177,458.
Sep. 29, 2008 Non-Final Rejection for U.S. Appl. No. 11/177,458.
Mar. 18, 2009 Non-Final Rejection for U.S. Appl. No. 11/177,458.
Aug. 19, 2009 Applicant Summary of Interview with Examiner for U.S. Appl. No. 11/177,458.
Dec. 11, 2006 Election/Restriction Requirement for U.S. Appl. No. 11/178,100.
Apr. 6, 2007 Non-Final Rejection for U.S. Appl. No. 11/178,100.
Oct. 3, 2007 Notice of Allowance and Fees Due for U.S. Appl. No. 11/178,100.
Issue Notification for U.S. Appl. No. 11/178,100.

* cited by examiner

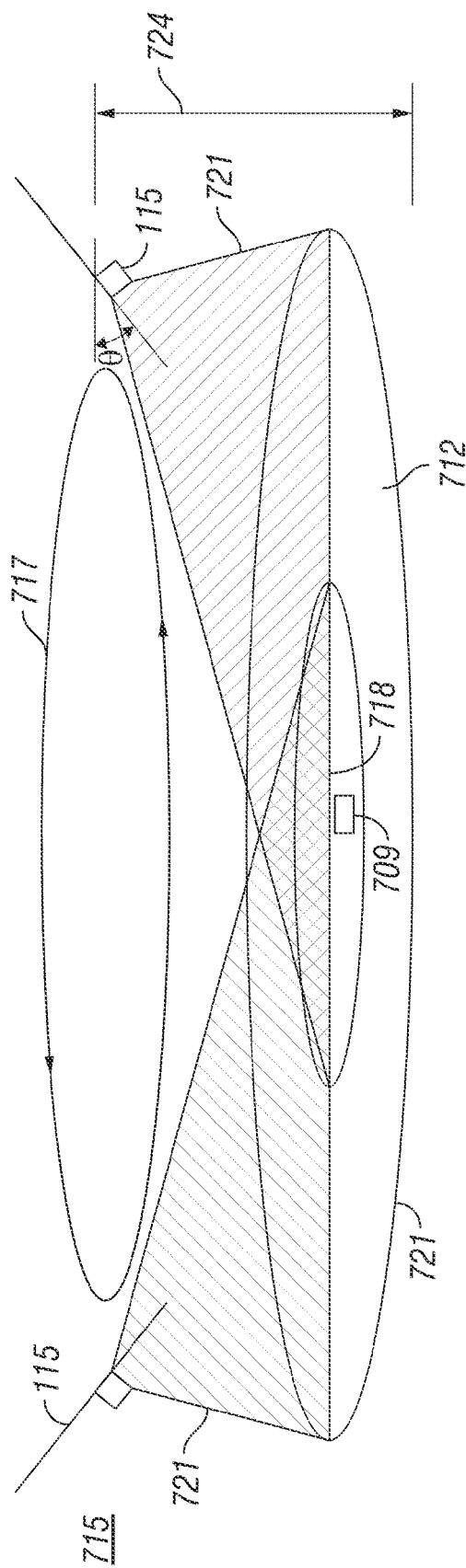

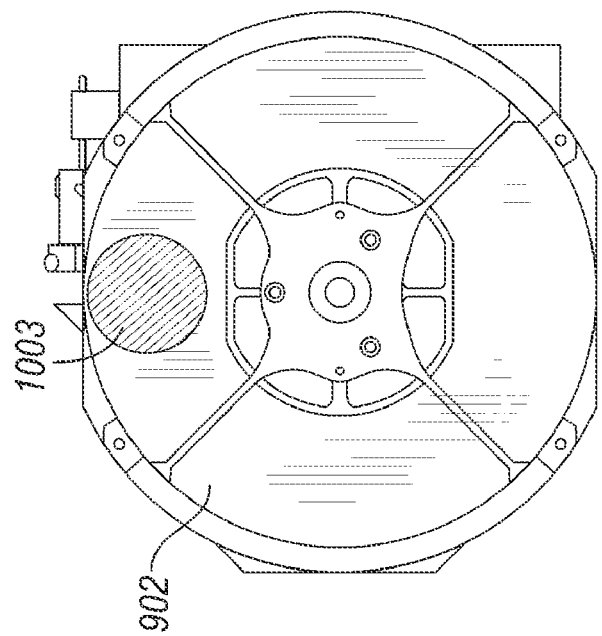
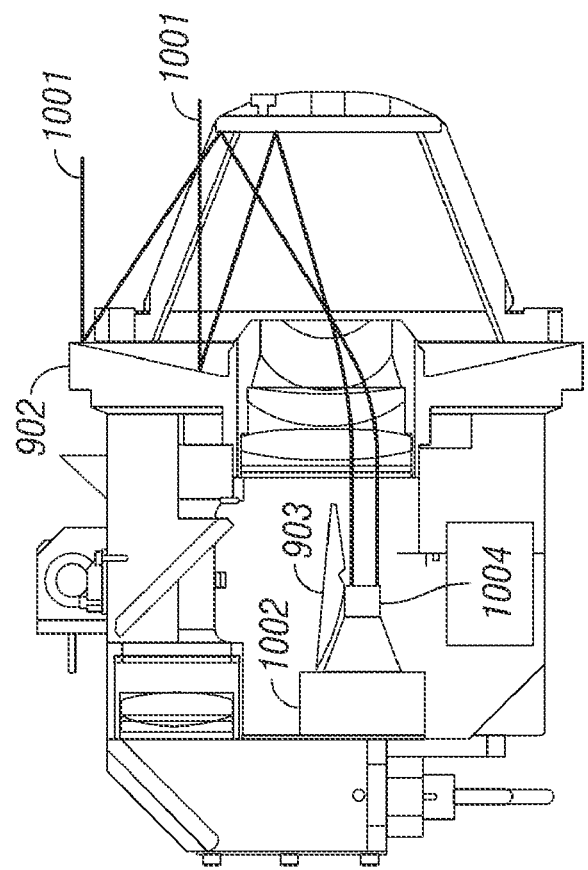

LOOKDOWN AND LOITERING LADAR SYSTEM

This is a continuation of U.S. patent application Ser. No. 11/177,782, entitled "Lookdown And Loitering Ladar System", and filed Jul. 8, 2005, in the name of the inventor Nicholas J. Krasutsky, now abandoned. The earlier effective filing date of that application is hereby claimed under 35 U.S.C. §120. That application is also hereby incorporated by reference in full and for all purposes as is if set forth verbatim herein.

BACKGROUND OF THE INVENTION

1. Field of the Invention

The present invention pertains to a laser detection and ranging ("LADAR") system and, more particularly, to a LADAR system with lookdown and loitering capabilities.

2. Description of the Related Art

A need of great importance in military and some civilian remote sensing operations is the ability to quickly detect and identify objects, frequently referred to as "targets," in a "field of regard." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe and as a target or not.

Remote sensing techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit and receive radio waves to and reflected from objects, LADAR systems transmit laser beams and receive reflections from targets. Because of the short wavelengths associated with laser beam transmissions, LADAR data exhibits much greater resolution than RADAR data. Typically, a LADAR system creates a three-dimensional ("3-D") image in which each datum, or "pixel", comprises an (x,y) coordinate and associated range for the point of reflection.

LADAR systems used for small missile applications are generally mounted at the front of the missile to maximize the collection area for the receiver while maintaining the missile cross section. These LADAR systems use an optical dome which limits the field of regard ("FOR"). Some of these LADARs use a strap-down, staring configuration. In others, gimbals are used to provide stabilization, scan the LADAR transmit beam, and increase the sensor FOR. Traditional gimbal configurations place the gimbal supports along the side of the missile body, using the outer support for elevation and the inner ring for azimuthal motion. Such an arrangement is described in, for example:

(i) U.S. Pat. No. 5,200,606, entitled "Laser Radar Scanning System," on Apr. 6, 1993, to LTV Missiles and Electronics Group as assignee of the inventors Nicholas J. Krasutsky et al.;

(ii) U.S. Pat. No. 5,224,109, entitled "Laser Radar Transceiver," on Apr. Jun. 29, 1993, to LTV Missiles and Electronics Group as assignee of the inventors Nicholas J. Krasutsky et al.; and (iii) U.S. Pat. No. 5,285,461, entitled "Improved Laser Radar Transceiver," on Feb. 8, 1994, to Loral Vought Systems Corporation as assignee of the inventors Nicholas J. Krasutsky et al.

Each of these patents is now commonly assigned herewith.

Some gimbaling arrangements where the outer gimbal provides the azimuthal motion have been used in belly-mounted configurations. However, this is not compatible with a missile attack scenario and greatly limits the conditions under which the missile can be launched. As LADAR systems and missile weapons systems become more sophisticated, this mission scenario is becoming more common.

Furthermore, providing missiles with designator capabilities has also proved problematic because, unless the missile can loiter and keep the designator beam on target, the time available for designation is very limited. With a front mounted sensor and a gimbal with a limited FOR, the missile can designate as it is flying toward the target. The designator loses sight of the target as the missile passes over it and the missile must turn around to begin designation again. This intermittent designation time is incompatible with the normal operation of a designator which must keep the beam in the target so the attacking missile can track on it.

The present invention is directed to resolving, or at least reducing, one or all of the problems mentioned above.

SUMMARY OF THE INVENTION

The present invention includes, in its various aspects and embodiments, a laser detection and ranging ("LADAR") system and with lookdown and loitering capabilities. In one aspect, the invention includes an apparatus comprising a LADAR sensor and a gimbal. The LADAR sensor is mounted to the gimbal, which is capable of scanning in azimuth sufficient to provide a look down and loitering capability. In another aspect, the invention includes a method comprising flying an airborne vehicle through an environment; and scanning a LADAR signal forward and to at least one side into a field of regard.

BRIEF DESCRIPTION OF THE DRAWINGS

The invention may be understood by reference to the following description taken in conjunction with the accompanying drawings, in which like reference numerals identify like elements, and in which:

FIG. 7A-FIG. 7C depict the LADAR system of FIG. 1-FIG. 2 in operation in a lookdown and loitering scenario;

FIG. 8A-FIG. 8D illustrate an on-gimbal laser designator, first shown in FIG. 4, from different perspectives;

FIG. 10A-FIG. 10B illustrate in a cross section and a plan view, respectively, the sensor of FIG. 1 with the scan mirror in the SAL position for SAL operations.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

This present invention comprises a LADAR gimbaling and windowing technique that allows LADAR systems to be used in loitering aerial platforms, although the invention is not so limited. The gimbal and window arrangement described herein allows the LADAR system to be mounted in the front of an aerial platform and used over azimuth angles exceeding ±90°. This capability allows the LADAR system to be used to both track and accurately designate targets continuously while the missile moves above in a circular loitering pattern. This capability is provided by reversing the gimbal axes, using window arrangements that cover a very wide azimuth angle and designing the sensor head and gimbal to move freely through wide angles without hitting the windows or the sides of the missile. This arrangement also facilitates the use of laser designators in conjunction with the LADAR so that designation can be performed on moving targets while the missile loiters above the target area.

A large mode area fiber was used to move the transmitter output to the gimbal. This frees the laser from the size and weight constraints associated with being located on the gimbal and facilitates the placing of the designator on the gimbal. The designator laser outputs much larger pulses than the laser used for the LADAR so it was placed on the gimbal rather than also being fiber coupled to the sensor head. This arrangement is the preferred embodiment but fiber coupling both the LADAR and designator lasers as well as putting the LADAR laser on the gimbal is considered to be covered by this disclosure.

Figure 1:
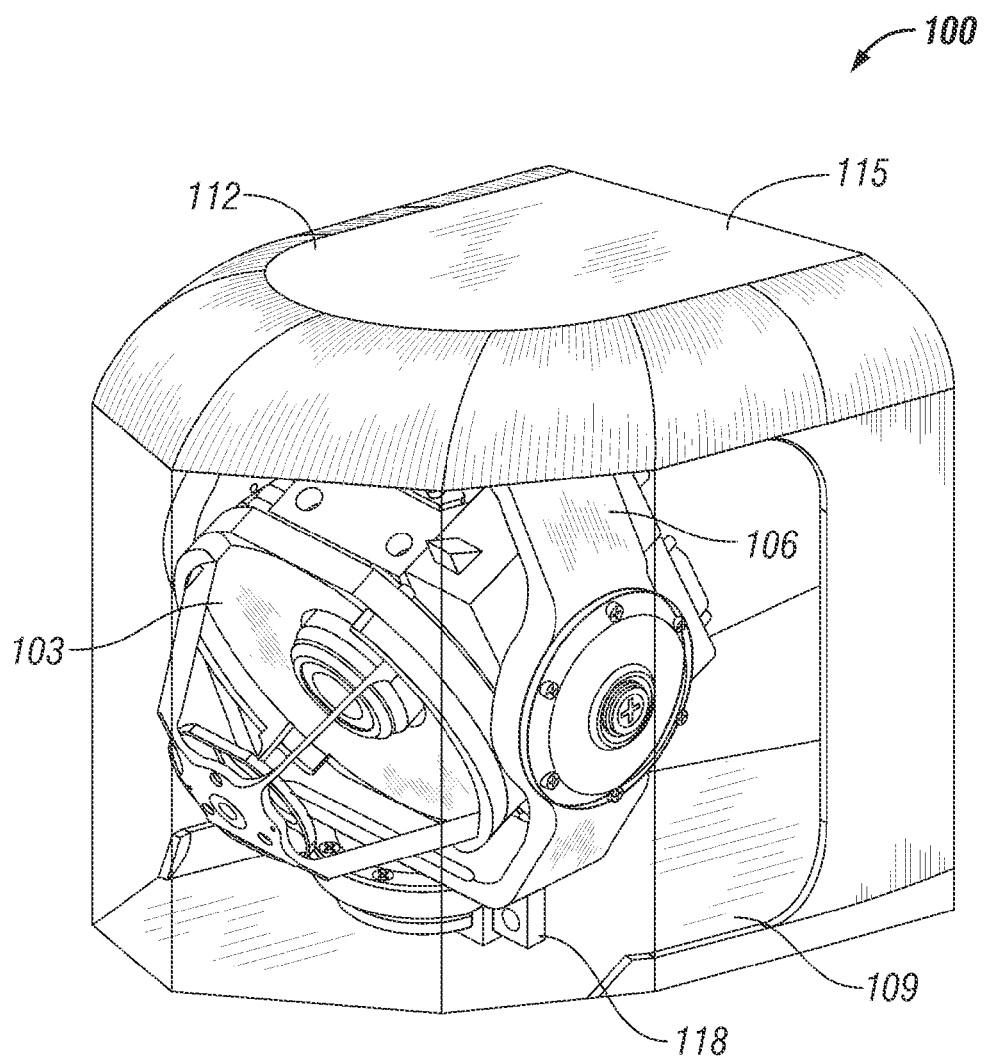
FIG. 1 illustrates a LADAR system in one particular embodiment constructed and operated in accordance with the present invention in an assembled view.
Figure 2:
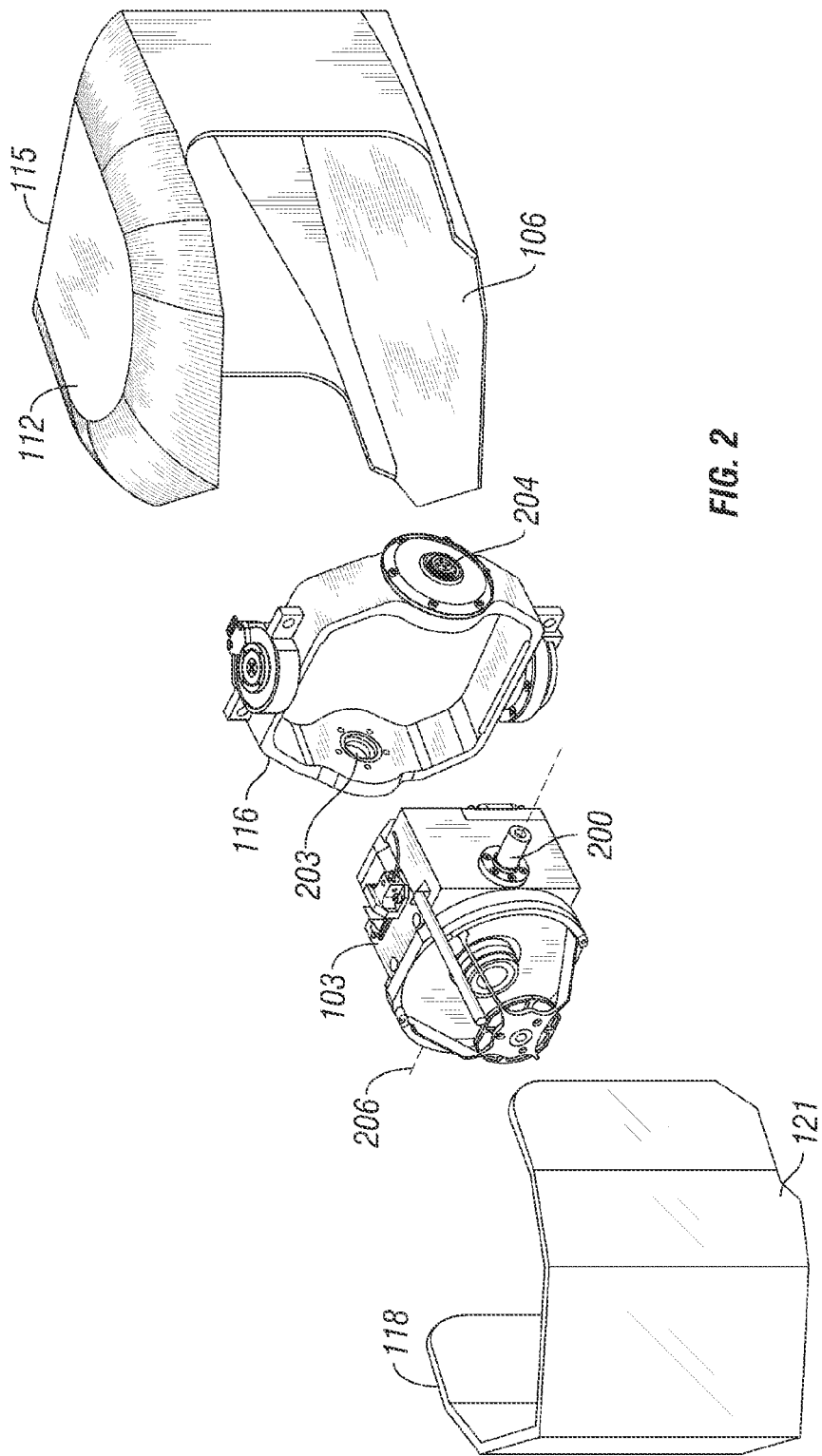
FIG. 2 illustrates the LADAR system of FIG. 1 in an exploded view.

FIG. 1 and FIG. 2 illustrate a LADAR system 100 in one particular embodiment constructed and operated in accordance with the present invention in assembled and exploded views, respectively. In general, the LADAR system 100 includes a sensor 103 mounted in a gimbal ring 106. The assembled sensor 103 and gimbal ring 106 are housed in a chamber 109, as shown in FIG. 1, defined by a forward end 112 of a platform 115. In the illustrated embodiment, the platform 115 is an aerial vehicle, and more particularly a missile or an airborne guided submunition, but this is not necessary to the practice of the invention.

The platform 115 includes a faceted window 118 that closes the chamber 109, as will be discussed further below. The faceted window 118 provides a wide Field of Regard ("FOR"). It also protects the sensor 103 and gimbal ring 106 from environmental conditions and, in this particular embodiment, aerodynamic forces. The faceted window 118 also contributes to the aerodynamic performance of the platform 115 as a whole, as will be recognized by those skilled in the art having the benefit of this disclosure. Note that the fuselage of the forward end 112 is shaped to match the faceting of the window 118. This also is not necessary to the practice of the invention, but enhances the aerodynamic performance of the platform 115 in this particular embodiment.

The sensor 103 may be any suitable LADAR sensor known to the art. Suitable LADAR sensors are disclosed in the aforementioned patents—namely:

(i) U.S. Pat. No. 5,200,606, entitled "Laser Radar Scanning System," on Apr. 6, 1993, to LTV Missiles and Electronics Group as assignee of the inventors Nicholas J. Krasutsky et al. ("the '606 patent);

(ii) U.S. Pat. No. 5,224,109, entitled "Laser Radar Transceiver," on Apr. Jun. 29, 1993, to LTV Missiles and Electronics Group as assignee of the inventors Nicholas J. Krasutsky et al. (the '109 patent); and (iii) U.S. Pat. No. 5,285,461, entitled "Improved Laser Radar Transceiver," on Feb. 8, 1994, to Loral Vought Systems Corporation as assignee of the inventors Nicholas J. Krasutsky et al.

Applicant hereby incorporates by reference for all purposes those portions of the cited patents disclosing the composition and operation of the sensor as if set forth verbatim herein. Note that the sensors of the cited patents are gimbaled in accordance with what is now conventional practice. Applicant does not incorporate by reference those portions of the cited patents addressing the gimbaling of the sensors.

Figure 3:
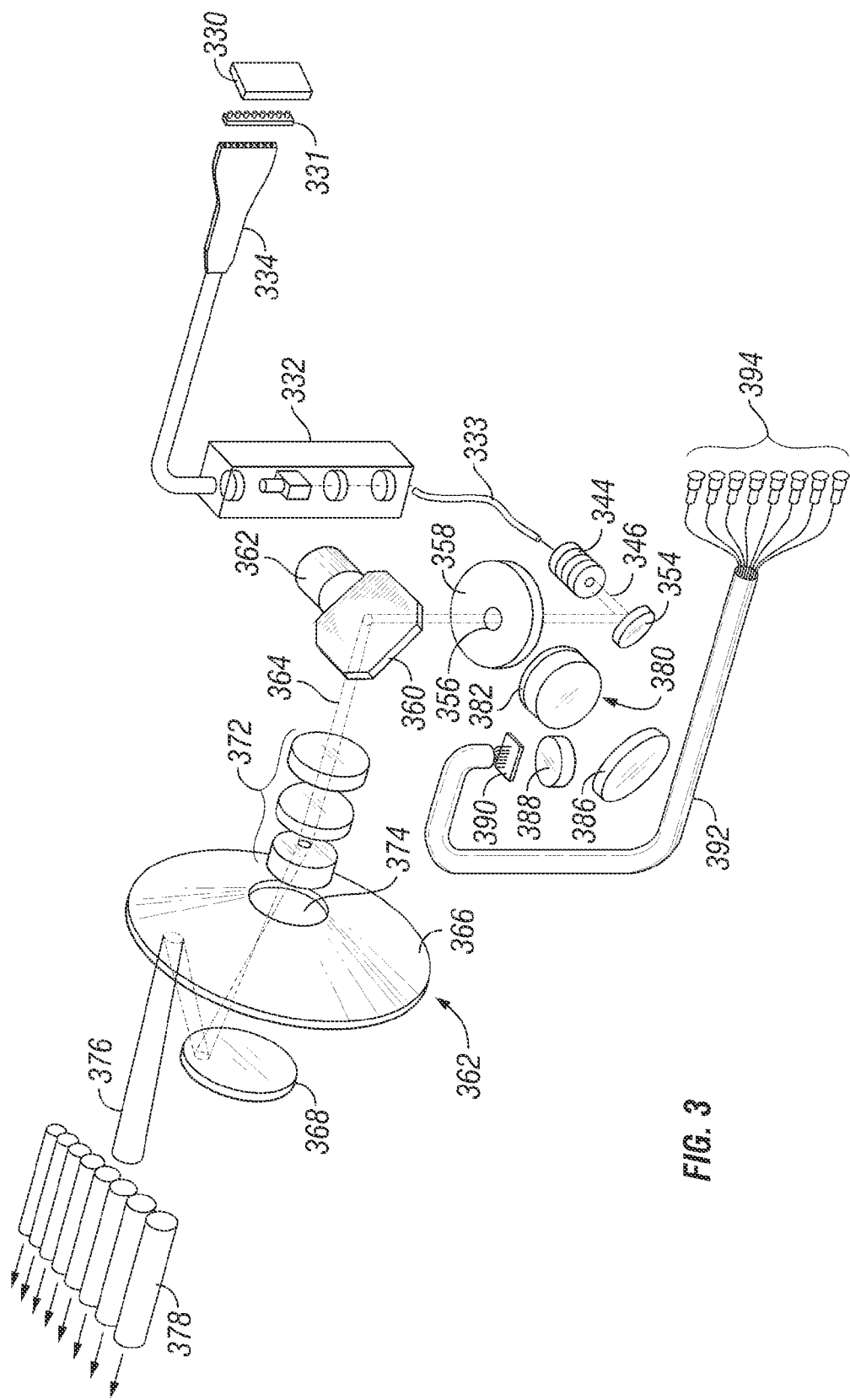
FIG. 3 is an exploded view of several components of an optical train of one particular embodiment of the sensor in the LADAR system of FIG. 1-FIG. 2.

For the sake of clarity and to further an understanding of the present invention, a portion of '606 patent describing the optics of the sensor therein is reproduced below somewhat modified. Turning now to FIG. 3, selected portions of the optics 300 of that sensor are shown in an exploded view. A gallium aluminum arsenide ("GaAlAs") laser 330 pumps a solid state laser 332. The solid state laser 332 emits the laser light energy employed for illuminating the target. The GaAlAs pumping laser 330 produces a continuous signal of wavelengths suitable for pumping the solid state laser 332, e.g., in the crystal absorption bandwidth. Pumping laser 330 has an output power, suitably in the 10-20 watt range, sufficient to actuate the solid state laser 332.

The pumping laser 330 and the solid state laser 332 are fixedly mounted on the housing of the forward end 112. The output of the solid state laser 332 is transported to the gimbal by means of a high power optical fiber 333. Since the solid state laser 332 is fiber-coupled to the gimbal, many laser types can be used, e.g., side pumped lasers and fiber lasers, provided they can be coupled into the fiber. In the case of fiber lasers it is also possible to use the lasing fiber directly to connect to the sensor head. Thus, alternative embodiments may use lasers other than solid state lasers. Output signals from the high power optical fiber 333 are transmitted through a beam input lens 331 and a fiber optic bundle 334. The fiber optic bundle 334 has sufficient flexibility to permit scanning movement of the LADAR system 100 during operation as described below.

Still referring to FIG. 3, the solid state laser 332 is suitably a Neodymium ("Nd") doped yttrium aluminum garnet ("YAG"), a yttrium lithium fluoride ("YLF"), or a $Nd:YVO_4$ laser. The solid state laser 332 is operable to produce, in this particular embodiment, pulses with widths of 10 to 20 nanoseconds, peak power levels of approximately 10 kilowatts, at repetition rates of 10-120 kHz. The equivalent average power is in the range of 1 to 4 watts. The preferred range of wavelengths of the output radiation is in the near infrared range, e.g., 1.047 or 1.064 microns.

The output generated by solid state laser 332, in the present embodiment, is carried to the gimbaled head by the high power fiber 333, as mentioned above. The high power fiber 333 has sufficient flexibility to permit scanning movement of the LADAR system 100 during operation as described below. The output end of the high power fiber 333 is mounted on the gimbaled head so that the laser beam emerging from it passes through the beam expander 340. The beam expander 340 comprises a series of (negative and positive) lenses which are adapted to expand the diameter of the beam to provide an expanded beam 342, suitably by an 8:1 ratio, while decreasing the divergence of the beam.

The expanded beam 342 is next passed through a beam segmenter 344 for dividing the beam into a plurality of beam segments 346 arrayed on a common plane, initially overlapping, and diverging in a fan shaped array. The divergence of the segmented beams 346 is not so great as to produce separation of the beams within the LADAR system 100, but preferably is sufficiently great to provide a small degree of separation at the target, as the fan-shaped beam array is scanned back and forth over the target (as will be described below with reference to output beam segments 348). Beam segmentation can be accomplished by using a series of calcite wedges, a holographic diffraction grating or a phased diffraction grating. The preferred method is using a phased diffraction grating because of its predictable performance and power handling capability.

As shown in FIG. 3, the resultant segmented beams 346 are then reflected from a third turning mirror 354, passed through an aperture 356 of an apertured mirror 358, and subsequently reflected from a scanning mirror 360 in a forward direction relative to the platform 115. The aperture 356 is located off the center of the aperture mirror 358. The scanning mirror 360 is pivotally driven by a scanning drive motor 362, which is operable to cyclically scan the beam segments 346 for scanning the target area. In a preferred embodiment, the beam segments 346 are preferably scanned at a rate of approximately 100 Hz. The turning axis of the scanning drive motor 362 is aligned in parallel with the segmenter 344 axis whereby the resultant beam array 346 is scanned perpendicularly to the plane in which the beams are aligned.

An afocal, Cassegrainian telescope 362 is provided for further expanding an emitted beam 364 and reducing its divergence. The telescope 362 includes a forward-facing primary mirror 366 and a rear-facing secondary mirror 368. A lens structure 372 is mounted in coaxial alignment between the primary mirror 366 and the scanning mirror 360, and an aperture 374 is formed centrally through the primary mirror in alignment with the lens structure.

The transmitted beams which are reflected from the scanning mirror are directed through the lens structure 372 for beam shaping, subsequently directed through the aperture 374 formed centrally through the primary mirror, and subsequently reflected from the secondary mirror 368 spaced forwardly of the primary mirror and is then reflected from the front surface of the primary mirror 366. The resultant transmitted beam 376, is a fan shaped array which is scanned about an axis parallel to its plane. The beam array 378 illustrates the diverged spacing of the beam segments as they reach the target, wherein the beams are in side-by-side orientation, mutually spaced by a center-to-center distance of twice their diameters.

The telescope 362 receives laser energy reflected from a target that has been illuminated by the array of transmitted beams. This received energy is then reflected successively through the primary mirror 366 and the secondary mirror 368, the lens assembly 372, and the scanning mirror 360, toward the apertured mirror 358. Because the reflected beam is of substantially larger cross-sectional area than the transmitted beam, it is incident upon the entire reflecting surface of the apertured mirror 358, and substantially all of its energy is thus reflected laterally by the apertured mirror 358 toward collection optics 380.

The collection optics 380 includes a narrow band filter 382, for filtering out wavelengths of light above and below a desired laser wavelength to reduce background interference from ambient light. The beam then passes through condensing optics 384 to focus the beam. The beam next strikes a fourth turning mirror 86 toward a focusing lens structure 388 adopted to focus the beam upon the receiving ends 390 of a light collection fiber optic bundle 392. The opposite ends of each optical fiber 392 are connected to illuminate a set of diodes 394 in a detector array, whereby the laser light signals are converted to electrical signals which are conducted to a processing and control circuit (not shown).

The fiber optic bundle 392 preferably includes nine fibers 393 (only one indicated), eight of which are used for respectively receiving laser light corresponding to respective transmitted beam segments and one of which views scattered light from the transmitted pulse to provide a timing start pulse. Accordingly, the input ends 390 of the fibers 392 are mounted in linear alignment along an axis which is perpendicular to the optical axis. The respective voltage outputs of the detectors 394 thus correspond to the intensity of the laser radiation reflected from mutually parallel linear segments of the target area which is parallel to the direction of scan.

Figure 4:
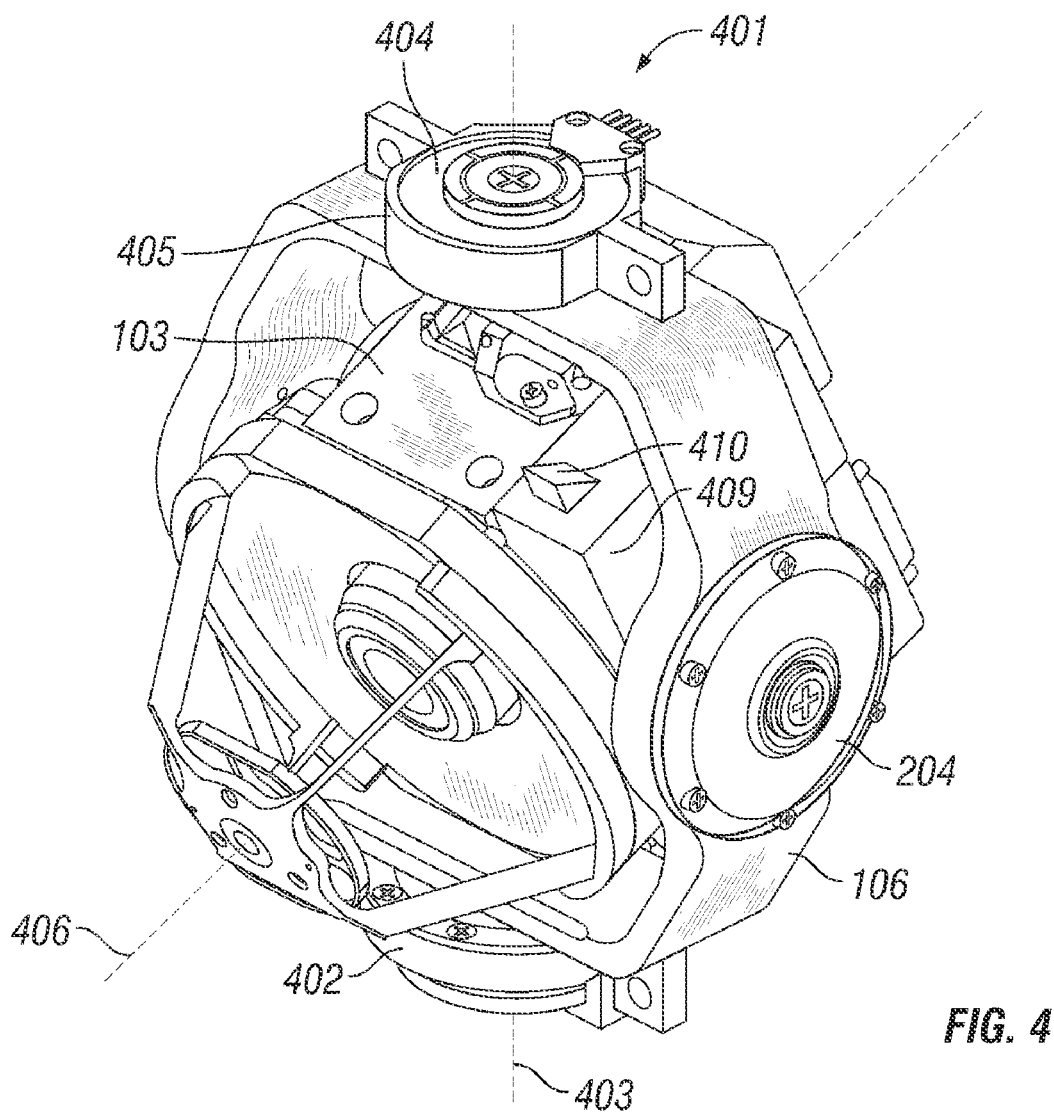
FIG. 4 shows LADAR sensor of FIG. 1-FIG. 2, which is alternative to that shown in FIG. 3 mounted to the gimbal ring.

However, the invention admits wide variation in the implementation of the sensor 103. FIG. 4 shows an alternative LADAR sensor 103 mounted to the gimbal ring 106. As is best shown in FIG. 2, the sensor 103 includes a pair of trunions 200 (only one shown) that are rotatably mounted within a pair of bores 203 (only one shown) in the gimbal ring 106. The bores 203 include mechanical assemblies such as bearings, bushing, etc. (not shown) to facilitate rotation of the trunions 200 in the bores 203 in a manner known to the art. The LADAR sensor 103 is a variant of the sensor described in the '109 patent referenced above and employs an optical train similar to that described above relative to FIG. 3. A servo-drive motor 204 drives the sensor 103 through the trunions 200 to scan the sensor in elevation. In the illustrated embodiment, the sensor 103 is scanned in elevation approximately ±30° relative to the axis 206 defined by the trunions 200 and shown in FIG. 2 in broken lines. However, the amount of elevational scan is implementation specific and may differ in alternative embodiments.

Returning to FIG. 4, the sensor 103 is mounted through the gimbal ring 106 from the top 401 and bottom 402 so that extended travel and scanning in azimuth is possible. Note that "top" and "bottom" are defined relative to the nominal orientation of the platform 115 relative to the Earth's field of gravity or the ground surface. As the platform 115 changes this orientation, so, too, will the orientation of the "top" 401 and "bottom" 402 relative to these references. The sensor 103 is mounted through the gimbal ring 106 using a trunion/bore approach and bearing/bushing approach similar to that described immediately above and as is conventional in the art. The sensor 103 and gimbal ring 106 are driven in azimuth by servo-motor 405 about an axis 403 shown in FIG. 4 in broken lines. The sensor 103 is driven in elevation by the servo motor 204 about an axis 206 shown in FIG. 2 in broken lines.

The position of the gimbal in elevation and azimuth is measured by position sensing devices located on the opposite sides of the gimbal ring across from each of the servomotors 204 and 402. The azimuthal position sensor 401 is shown in FIG. 4 along with the corresponding azimuthal gimbal servo-motor 405. Position can be sensed by a number of devices including potentiometers, electrical encoders and optical encoders, or other techniques known to the art, with the preferred method being optical encoders.

In the illustrated embodiment, the gimbaled sensor 103 is capable of scanning in azimuth substantially past 180°. In the illustrated embodiment, the goal is a full 210° scan and the term "substantially" is a recognition that sometimes manufacturing variances or tolerances or sometimes operational conditions impair achievement of a full 210° azimuthal scan. The illustrated embodiment achieves the 210° scan by scanning ±105° from the boresight 406, or longitudinal axis of the platform 115, shown in broken lines in FIG. 4.

However, this is not necessary to the practice of the invention in all embodiments. One intended purpose of the present invention is application in a lookdown and loitering mode, as is discussed further below relative to FIG. 7A-FIG. 7C. Thus, all that is required is that the gimbaled receiver 103 be able to scan sufficiently far in azimuth to one side of the platform 115 so as to enable this functionality. An embodiment capable of scanning a full 210° by scanning ±105° off boresight is more versatile. However, this functionality can be achieved by scanning off to only one side 90° off boresight. In general, any given embodiment should be able to scan at least 90° off boresight to at least one side of the platform 115.

Referring again to FIG. 3, in the illustrated embodiment, the LADAR transmitter has been moved off the gimbal and its output is coupled to the sensor head 103 by means of an optical fiber 333. This simplifies the packaging of the sensor 103. Off-gimbal laser configurations have been used in gimbaled systems in the past but they generally used complicated mirror configurations to maintain alignment between the transmit and receive paths. Recent developments in Large Mode Area ("LMA") optical fibers have allowed high peak powers to be transmitted while maintaining good beam optical quality. These fibers can emit directly as part of a fiber laser or amplifier, alternatively, they can be used to transmit the output from any laser up to the gimbaled platform.

Figure 5A:
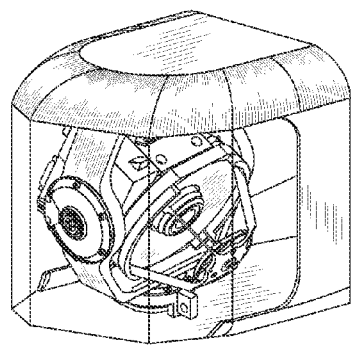
FIG. 5A-FIG. 5D show several views of the LADAR system of FIG. 1-FIG. 2 positioned at various angles in azimuth and elevation.
Figure 5B:
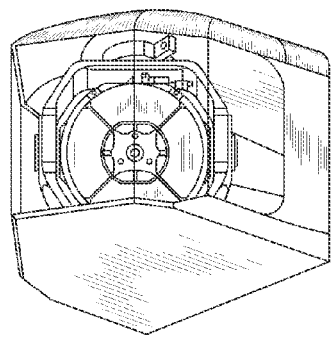
Figure 5C:
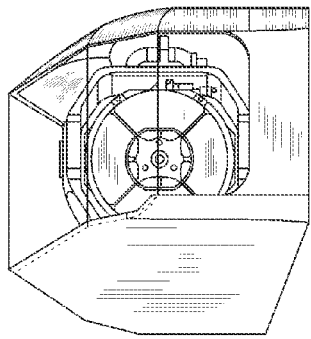
Figure 5D:
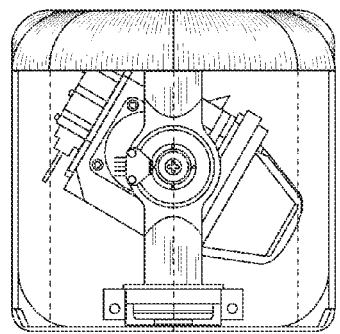

Returning to FIG. 1-FIG. 2, the sensor head 103 and gimbal ring 106 are sized to fit within the chamber 109 defined by the platform 115 as the sensor 103 is scanned. Several views of the LADAR system 100, positioned at various angles, are shown in FIG. 5A-FIG. 5D. More particularly, using the intersection of the boresight 406, shown in FIG. 4, and the axis 206, shown in FIG. 2, as the origin, FIG. 5A-FIG. 5B show the sensor 103 positioned at 55° azimuth, −30° elevation in perspective and front, plan views, respectively. FIG. 5C shows the sensor 103 positioned at 90° azimuth, −30° elevation in a side, perspective view. FIG. 5D shows the sensor 103 positioned at 90° azimuth, −13° elevation in a side, plan view.

Returning to FIG. 1-FIG. 2 again, the flat window segments 121 (six of which are shown in FIG. 2, but only one of which is indicated) of the faceted window 118 provide a wide FOR. The window segments 121 are fabricated from a material that transmits the LADAR signal but can also withstand applicable environmental conditions. In the illustrated embodiment, one important environmental condition is aerodynamic heating due to the velocity of the platform 115. Another important environmental condition for the illustrated embodiment is abrasion, such as that caused by dust or sand impacting the window 118 at a high velocity. Thus, for the illustrated embodiment, BK-7 glass is a highly desirable material, but alternative embodiments may employ fused silica. ZnSe, $Al_2O_3$, Ge, and Pyrex.

Using the flat window segments 121 rather than a spherical dome (not shown) also reduces the cost of the window 118, allows wide azimuth angles, and allows more freedom in the placement of the gimbal trunions 200. There is no significant degradation on image quality provided the window facets 121 do not have any wedge angle between their surfaces. However, the faceted window 118 increases the overall length of the front end 112, has more aerodynamic drag and flow asymmetry, and requires seams. It also has the potential for reflection losses if the output beam meets any window surface at near grazing incidence.

Figure 6A:
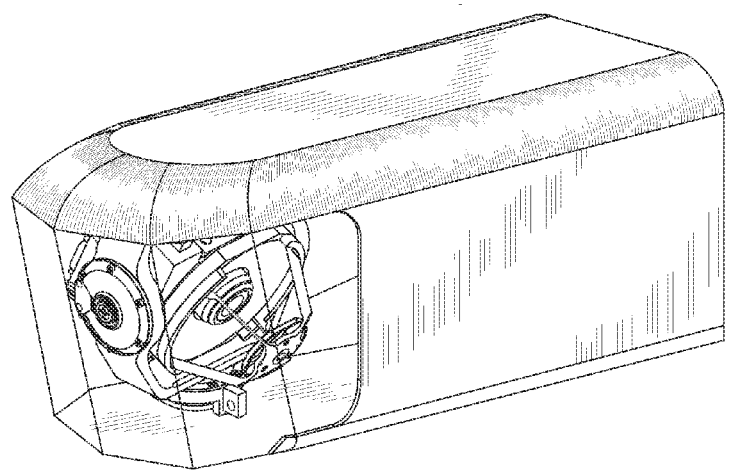
FIG. 6A-FIG. 6C illustrate alternative embodiments for the window of the LADAR system of FIG. 1-FIG. 2.
Figure 6B:
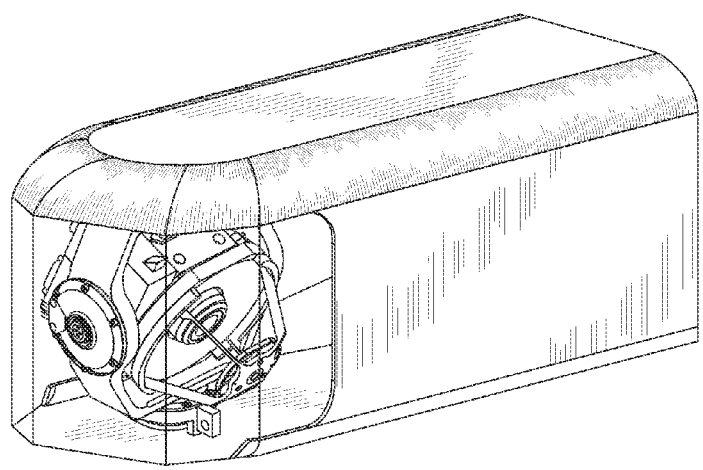
Figure 6C:
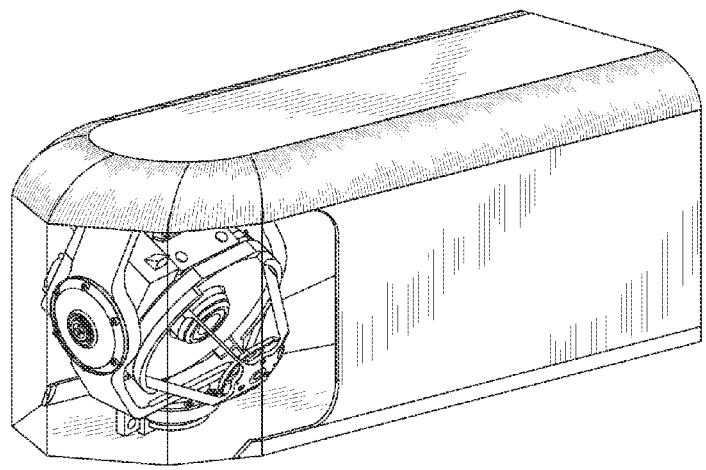

The specific window arrangement chosen depends on trades specific to the missile and its mission but some representative arrangements are shown in FIG. 6A-FIG. 6C. These show arrangements using different numbers of facets and different angles between the facets. They were picked because they have significantly different overall length and drag characteristics e.g. FIG. 6A has the shortest overall length but also has the most aerodynamic drag. All arrangements utilize a small number of facets and each facet is supported at the top and bottom by the airframe structure. As the number of facets is increased, a low drag aerodynamic shape can be approximated but this requires a large number of facets and a complicated support structure, adding significantly to the cost. Such shapes may be required for high speed or for very long range applications.

Note, however, that the faceted window 118 is not necessary to the practice of the invention in all embodiments. Alternative embodiments may instead employ, for instance, a single conventional, spherical hypersphere (not shown) or spherical segments (also not shown) if the aerodynamic requirements for a given application are sufficiently important. Alternatively, one compromise uses a spherical segment in front and one or two others out at right angles to the missile axis. If tone one side is domed, loitering must be down in the direction that places that segment towards the ground. Thus, the window 118 may also be spherical or spherically segmented in alternative embodiments.

The LADAR system 100 will also include electronic circuitry (not shown) for generating the scan signals that drive the servo-motors, laser, detectors, and scanning drive motor and to capture the information in the detected signals. Scan signal generation can be performed by first using the scanning drive motor 362 to drive the scan mirror 360 in elevation. This produces multiple rows of pulses as shown in FIG. 7B. Scanning the entire sensor in azimuth using the servo motor 405, shown in FIG. 4, then produces a scan of the target area. Suitable information capture and processing techniques are disclosed in:

(i) U.S. Pat. No. 6,115,113, entitled "Method for Increasing Single-Pulse Range Resolution," on Sep. 5, 2000, to Lockheed Martin Corporation as assignee of the inventor Stuart W. Flockencier;

(ii) U.S. Pat. No. 5,243,553, entitled "Gate Array Pulse Capture Device," on Sep. 7, 1993, to Loral Vought Systems Corporation as assignee of the inventor Stuart W. Flockencier.

Both of these patents are commonly assigned herewith. Note, however, that any suitable technique known to the art may be employed.

The electronic circuitry and detection electronics are fixedly mounted relative to the housing or other suitable supporting structure aboard the platform 115. The scanning and azimuth translations of the LADAR system 100 therefore do not affect corresponding movement of the detection system. Accordingly, the mass of the components which are translated during scanning is substantially lower than would be the case if all components were gimbal-mounted. These benefits are amplified in the case of the embodiment shown in FIG. 3 since the laser is also off-gimbal.

Since the LADAR system 100 is capable of looking out at over ±90° to both sides of the platform 115, it can be used over a wide swath as the platform 115 moves through its environment. Consider FIG. 7A, which shows the potential for target examination out to the range 700 of the LADAR system 100 on both sides of the flight path 703, shown in broken lines. The surveillance area 706 includes the area 709 that has already been reconnoitered and the area 712 currently under surveillance. The area 712 currently under surveillance is determined by the position of the platform 115, the range 700 of the LADAR system 100, and the extent of the azimuthal scan of the LADAR system 100.

The operation of one the gimbaled LADAR sensor 100 in scanning is conceptually illustrated in FIG. 7B. The gimbaled LADAR sensor 100 transmits the LADAR signal 705 to scan the area 712. Each scan is generated by scanning elevationally, or vertically, several times while scanning azimuthally, or horizontally, once within the FOR. FIG. 7B illustrates a single elevational scan 707 during the azimuthal scan 708. Thus, each scan is defined by a plurality of elevational scans such as the elevational scan 707 and the azimuthal scan 708. The velocity, depression angle of the sensor 103 with respect to the horizon, and total azimuth scan angle of the LADAR platform 115 determine the extent of the scan.

The LADAR signal 705 is typically a pulsed signal and may be either a single beam or a split beam. Because of many inherent performance advantages, split beam laser signals are typically employed by most LADAR systems. A single beam may be split into several beamlets spaced apart from one another by an amount determined by the optics package (not shown) aboard the platform 115 transmitting the LADAR signal 705. Each pulse of the single beam is split, and so the LADAR signal 705 transmitted during the elevational scan 707 in FIG. 7B is actually, in the illustrated embodiment, a series 711 of grouped beamlets 713 (only one indicated). The gimbaled LADAR sensor 103 transmits the LADAR signal 705 while scanning elevationally 707 and azimuthally 708. The LADAR signal 705 is continuously reflected back to the platform 115, where it is detected and captured.

The characteristics of the LADAR signal 705 will be a function of the LADAR sensor 103, which will, in turn, be a function of the mission in a manner known to the art. The LADAR sensor 300, shown in FIG. 3A-FIG. 3B, splits a single 0.2 mRad $1/e^2$ laser pulse into septets with a laser beam divergence for each spot of 0.2 mRad with beam separations of 0.4 mRad. The optics package includes fiber optical array (not shown) having a row of seven fibers spaced apart to collect the return light. The fibers have an acceptance angle of 0.3 mRad and a spacing between fibers that matches the 0.4 mRad far field beam separation. An elevation scanner (not shown) spreads the septets vertically by 0.4 mRad as it produces the vertical scan angle. The optical transceiver including the scanner is then scanned azimuthally to create a full scan raster.

Assume the LADAR system 100 identifies the target 710 as an object of interest, and wishes to continue observing the object. As is shown in FIG. 7C, the platform 115 flies a circular loiter pattern 717 over the target area 715, including the current surveillance area 712. In the illustrated embodiment, the loiter pattern 717 is in a clockwise direction, but could alternatively be counterclockwise. The LADAR system 100 can then look out to the side and examine a portion 718, the constant track and surveillance area, of the area 712 being circled. If the platform 115 flew level, the loitering radius for the loiter pattern 717 would need to be large enough to allow the LADAR system 100 look down to see the ground at the maximum gimbal lookdown angle. If, however, bank-to-turn guidance is used, the platform 115 will bank into the turn, providing the sensor with additional lookdown capability.

The bank angle Θ of the platform 115, shown in FIG. 7C, is a function of the turn radius and the velocity of the platform 115. For highly maneuverable platforms, the bank angle Θ can exceed 60°. The banking of the platform 115 rotates the LADAR system 100 and provides additional down-look capability for the seeker relative to the ground. Depending on the bank angle Θ, the LADAR system 100 could look straight down or even past vertical. This is evident from the indicated coverage cone 721 in FIG. 7C.

More particularly, FIG. 7C shows two areas 712, 718 on the ground below the flight path 703. The area 718 shows the portion of the ground which is always visible to the LADAR system 100, regardless of the position of the platform 115 along its flight path 703. The area 712 is the additional area which can be seen by the LADAR system 100, depending on the position of the platform 115 along its flight path 703. The circle 721 drawn on the ground below the loiter pattern 717 of the flight path 703 shows the line where the LADAR system 100 is looking straight down. If the radius of the loiter pattern 717 is comparable to or smaller than the altitude 724 of the platform 115 much of the area 718 is viewed at steep angles to the ground. This facilitates use in urban or forested target areas where terrain masking is a problem for sensors working at shallow depression angles.

Figure 8A:
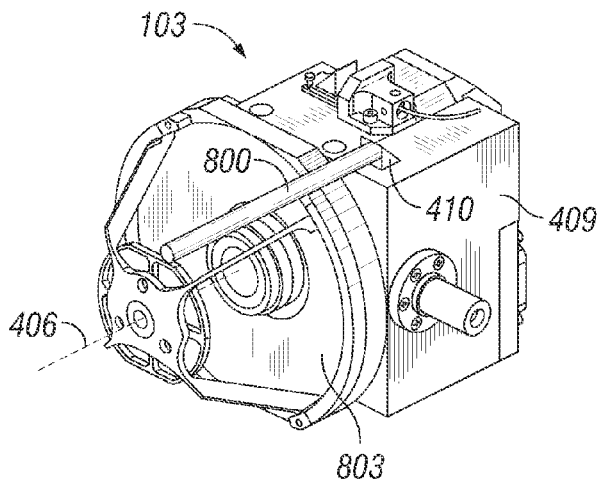
Figure 8B:
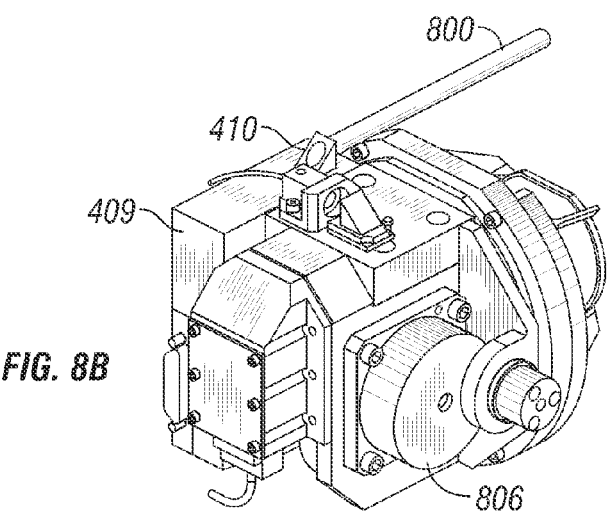
Figure 8C:
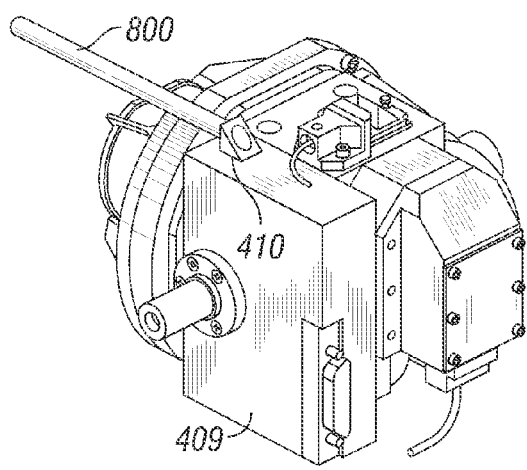

Returning now to FIG. 4, the illustrated embodiment also includes an on-gimbal laser designator 409 that provides a laser designator mode of operation. The laser designator 409 and associated turning prism 410 are better illustrated in FIG. 8A-FIG. 8C. More particularly, the laser designator 409 produces a pulsed laser beam 800 that may be used for target designation. FIG. 8A-FIG. 8C illustrates the emission of the pulsed beam 800 from the laser designator 409 through the turning prism 410 within the chamber 109 and behind the window 118. Note that it is possible to use the LADAR transmitter for designation but, since the power and beam characteristics normally required for designation are different from those required for LADAR operation, the laser design will be an undesirable compromise between the two requirements. The designator optics can be strap-down, as in the illustrated embodiment, or equipped with scanning mechanisms (not shown).

Figure 9B:
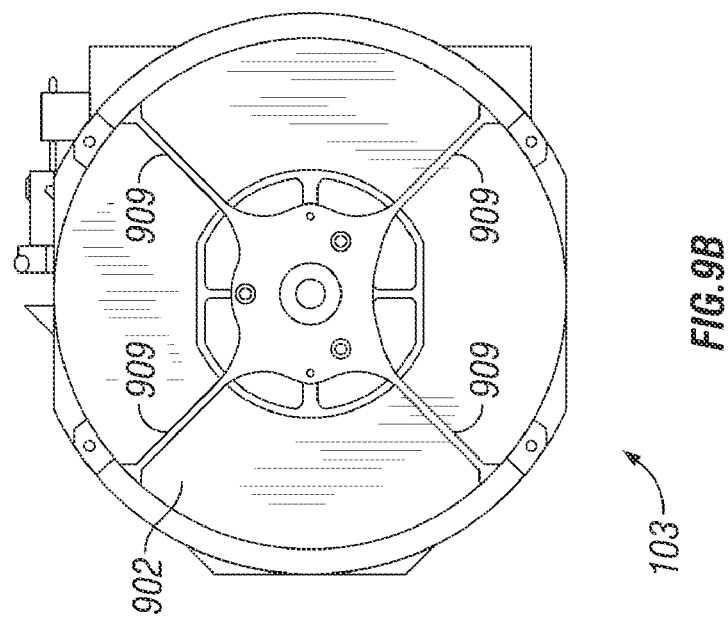
FIG. 9A-FIG. 9B illustrate in a cross section and a plan view, respectively, the sensor of FIG. 1 with a scan mirror in the LADAR position for LADAR operations.
Figure 9A:
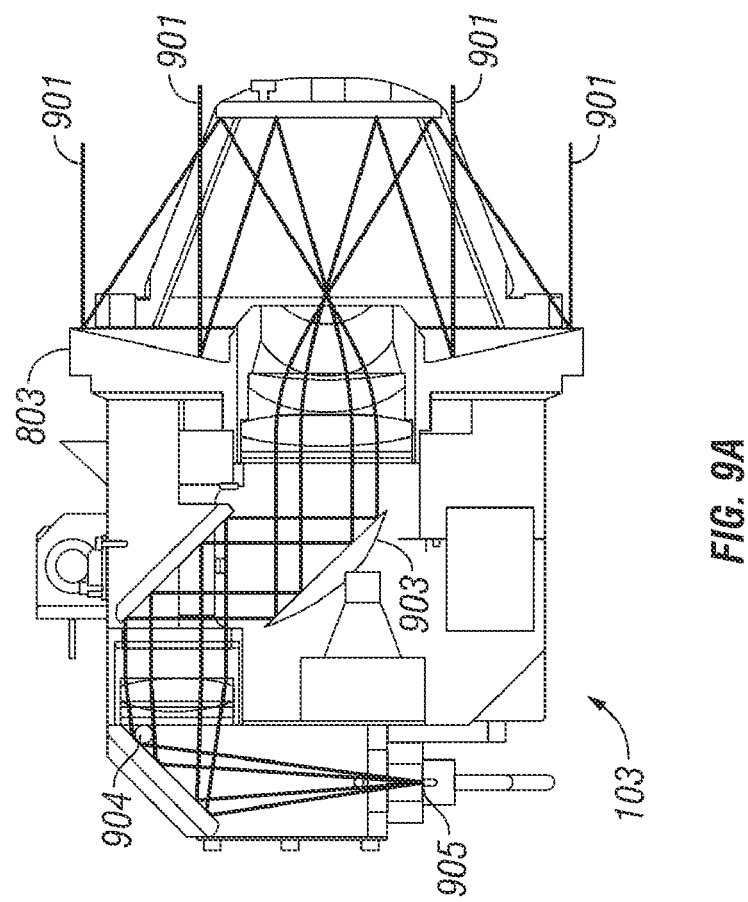

More particularly, the laser designator 409 is located on the sensor 103 and generates a laser beam 800. The laser beam 800 is directed off the sensor 103 by the turning prism 410 in a direction parallel to the optical axis 406 of the telescope 803. Referring now to FIG. 9A and FIG. 9B, the sensor 103 includes a scan mirror 903 that may be moved between two positions, one for use in LADAR operation and one for use in SAL, or designation, operations. The scanning mirror 903 is shown in the LADAR position. The scanning mirror 903 is mounted to and moved by elevation scanner motor 806, shown in FIG. 8B.

When the sensor 103 is being used in the LADAR mode, light from the LADAR laser is directed into the far field and falls on the target area as discussed above relative to FIG. 7A-FIG. 7C. Scattered light 901 from the target area is collected by the telescope 803 which directs it onto the elevation scan mirror 903. The scattered light 901 is then directed upward through the optical train 904 by the elevation scan mirror 903, and is focused onto the LADAR detector fiber array 905. The high speed scanner rotates the elevation scan mirror 903 through a small angle center around 45°. This provides the fiber array 905 with a view of the target scene at different elevations. The external gimbal 106 is used to provide stabilization and to scan the sensor 103 in azimuth so the entire target area can be examined by the LADAR and a three dimensional scene image can be formed.

FIG. 10A and FIG. 10B show the sensor 103 when it is being used in the SAL mode. Moving from the LADAR mode to the SAL mode is accomplished by flipping the elevation scan mirror 903 of the telescope optical path. The final position of the scanning mirror 903, as shown in FIG. 10A and FIG. 10B, is not critical as long as it is out of the way of the SAL detector optical aperture 1004 so that the SAL detector 1002 has a clear view through the telescope 803. It is assumed that the target is being designated by a source external to the platform 115 in this particular embodiment. Scattered light 901 coming from the target falls on the telescope 803. The SAL detector 1002 does not utilize all of the light falling on the telescope 803, but rather, only light 1001 which falls on the shaded area 1003 shown in FIG. 10A. The SAL detector input aperture 1004 is placed at the exit pupil of the telescope 803 and the shaded area 1003 represents the portion if the telescope 803 input aperture subtended by the SAL detector aperture 1004 at the entrance to the telescope 803.

Since SAL mode detector and optics are located at the exit pupil of the sensor telescope 803, the SAL optics have access to the entire angular field of regard of the telescope 803 but utilize only a specific, unmasked portion 1003 of the telescope 803 input aperture for light collection. This allows the SAL mode to use the optical magnification of the telescope 803 while having an optical path which is unobstructed by the telescope 803 secondary supports 909. The tradeoff is that only a portion of the entire telescope 803 aperture is used by the SAL detector. This limits the effective range of that mode but it preserves linearity and limits noise induced by the telescope 803 supports 909. The SAL sensor range should still be adequate for most missile applications, especially where lock-on before launch capability is not required. The small SAL mode optics make packaging easier and lower system cost. Both of these benefits are significant in small missile applications.

The scanning mirrors currently used in most LADARs are driven by placing them on a motor shaft. The motor controller then moves the mirror through the desired pattern needed for LADAR operation. These are usually high torque motors and moving them through large angles can be difficult because it involves moving across different motor windings where the available torque is limited. While the mirror 903 is being flipped from the LADAR position to the SAL position and back, neither mode is operational so the mirror can be driven open loop through the low torque region using the rotor and mirror inertia. Alternatively, a small set of secondary windings can be used to aid in the transition. Scanning mirrors can be controlled in a number of ways the specific method is not important, only the fact that it is used as part of the optical train in the LADAR mode and is moved out of the way for the SAL mode.

Moving back to the LADAR mode is accomplished in a similar fashion by flipping the scanning mirror 903 back to the position shown in FIG. 9A and FIG. 9B so that it can be used to direct the light into the LADAR detectors. Moving back and forth between the two modes can be done as often as the operational scenario requires, but the two modes cannot be used simultaneously.

Figure 7A:
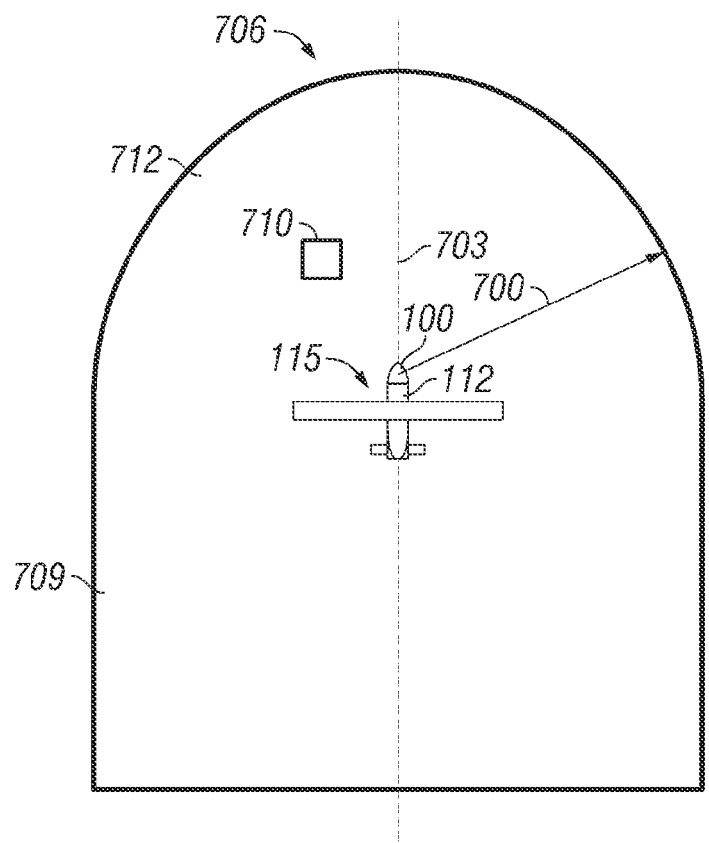
Figure 7B:
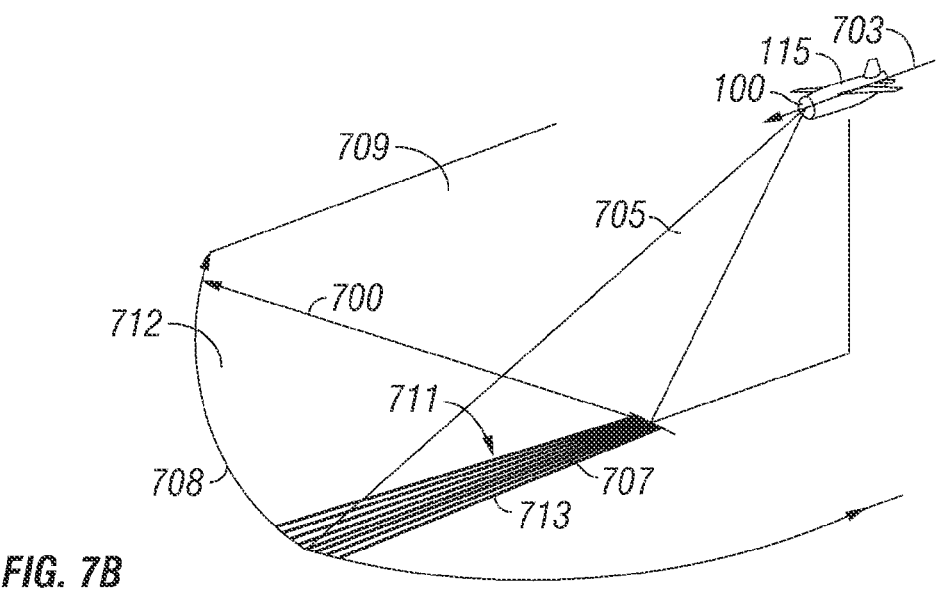

The LADAR system 100 can be used to locate and track the targets, e.g. the target 710 in FIG. 7A, and the coordinate information passed to the laser designator 409 in a number of ways. For instance, coordinate information may be passed as the coordinates of the target 710, derived from Global Positioning System ("GPS") coordinates platform 115 or as a targeting direction using an inertial measurement unit ("IMU") aboard the platform 115. In the illustrated embodiment, the LADAR sensor 103 and the designator 709 are aligned to allow pointing and targeting information to be shared directly between the two. Thus, the LADAR system 100 can be operated in LADAR mode as illustrated in FIG. 7A to locate the target 710. The LADAR system 100 will yield three-dimensional data describing the location of the target 710, which can then be passed to the control of the laser designator 409. This information can then be used to designate the target 710.

If the laser designator 409 and sensor 103 wavelengths are different, both can be operated simultaneously. If the laser designator 409 and sensor 103 are at the same wavelength, then the laser designator 409 might interfere with the LADAR operation of the sensor 103 when it is actively pulsing. This can be easily addressed because the duty cycle of the laser designator 409 is very low so the LADAR detectors (not shown) can be turned off during the designation pulse without significant loss in imaging capability.

The LADAR detectors can even be gated to pick up the return from the designation beam 800 so that the position of the designation beam 800 relative to the LADAR target image can be determined. This is an accurate way to maintain alignment between the two modes if the laser designator 409 has its own on-board steering mechanism. As the LADAR system 100 loiters, the laser designator 409 can maintain a spot on the target 710 as long as the target 710 remains in area 718 of FIG. 7A. Illuminating the top of the target 710 would prevent masking of the designator spot as the platform 115 executes its flight pattern. Alternatively, a nearby spot could be designated and the relative coordinates passed on for further use.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   flying an airborne vehicle through an environment;

loitering over an area within a field of regard for the airborne vehicle;
scanning a LADAR signal forward and to at least one side and at least 90° off a boresight into the field of regard while loitering; and
tracking a target while loitering.

2. The method of claim 1, wherein flying the airborne vehicle includes flying a flying submunition, a guided weapon system, a reconnaissance drone, or a manned aircraft.

3. The method of claim 1, wherein scanning the LADAR signal includes scanning in azimuth through 180°.

4. The method of claim 3, wherein scanning in azimuth through 180° includes scanning through ±90° off the boresight.

5. The method of claim 1, further comprising banking the airborne vehicle while loitering.

6. The method of claim 1, further comprising designating the target from aboard the airborne vehicle.

7. An apparatus, comprising
a LADAR sensor;
a gimbal to which the LADAR sensor is mounted, the gimbal being capable of scanning in azimuth sufficient to provide a look down and loitering capability;
a platform defining a chamber in which the LADAR sensor and gimbal are housed; and
a faceted window in the platform closing the chamber.

8. The apparatus of claim 7, wherein the gimbaled transceiver is capable of scanning in azimuth through at least 180°.

9. The apparatus of claim 8, wherein the gimbaled transceiver is capable of scanning through at least ±90° off a boresight.

10. The apparatus of claim 7, wherein the gimbaled transceiver is capable of transmitting at least 90° off a boresight.

11. The apparatus of claim 7, wherein the platform is a vehicle.

12. The apparatus of claim 11, wherein the vehicle is an airborne vehicle.

13. The apparatus of claim 7, wherein the window is hemispherical.

14. The apparatus of claim 7, wherein the window is hyperspherical.

15. A wide-angle LADAR system, comprising:
a platform defining a chamber;
a faceted window closing the chamber; and
a gimbaled LADAR sensor housed in the closed chamber capable of scanning in azimuth substantially through 180° and housed in the chamber to scan through the faceted window.

16. The LADAR system of claim 15, wherein the platform is a vehicle.

17. The LADAR system of claim 16, wherein the vehicle is an airborne vehicle.

18. The LADAR system of claim 15, further comprising a laser designator mounted on-gimbal with the LADAR sensor.

19. An apparatus, comprising:
an airborne vehicle defining a chamber in the forward end thereof;
a faceted window closing the chamber;
a gimbaled LADAR sensor housed in the closed chamber capable of scanning in azimuth substantially through 180° and housed in the chamber to scan through the faceted window; and
a laser designator mounted on-gimbal with the LADAR sensor.

20. The apparatus of claim 19, wherein the gimbaled transceiver is capable of scanning in azimuth through at least 180°.

21. The apparatus of claim 19, wherein the laser designator and the LADAR sensor are co-aligned.

22. The apparatus of claim 19, wherein the laser designator is pointed independently of the gimbal pointing direction.

23. The apparatus of claim 19, wherein the laser designator receives pointing and targeting information from the LADAR sensor.

24. The apparatus of claim 19, further comprising:
an off-gimbal LADAR laser; and
a large mode area fiber over which the beam generated by the LADAR laser is transmitted to the LADAR sensor.

25. A method, comprising:
flying an airborne vehicle through an environment;
scanning a LADAR signal forward and to at least one side and at least 90° off a boresight into a field of regard; and
designating a target from aboard the airborne vehicle.

26. The method of claim 25 wherein the designation employs LADAR information extracted aboard the airborne vehicle.

27. The method of claim 25, wherein the designation is performed by the LADAR transmitter.

28. The method of claim 25, wherein the designation is performed by a laser designator separate from the LADAR transmitter.

29. The method of claim 28, where the designation is performed on a gimbal to which the LADAR transmitter is mounted.

30. The method of claim 25, wherein scanning the LADAR signal includes scanning in azimuth through 180°.

31. The apparatus of claim 30, wherein the laser designator and the LADAR sensor are co-aligned.

32. The apparatus of claim 30, wherein the laser designator is pointed independently of the gimbal pointing direction.

33. The apparatus of claim 30, wherein the laser designator receives pointing and targeting information from the LADAR sensor.

34. The LADAR system of claim 15, further comprising:
an off-gimbal LADAR laser; and
a large mode area fiber over which the beam generated by the LADAR laser is transmitted to the LADAR sensor.

35. The method of claim 30, wherein scanning in azimuth through 180° includes scanning through ±90° off the boresight.

36. An apparatus, comprising
a LADAR sensor;
a gimbal to which the LADAR sensor is mounted, the gimbal being capable of scanning in azimuth sufficient to provide a look down and loitering capability; and
a laser designator mounted on-gimbal with the LADAR sensor.

37. The apparatus of claim 36, wherein the gimbal is capable of scanning in azimuth through at least 180°.

38. The apparatus of claim 37, wherein the gimbal is capable of scanning through at least ±90° off a boresight.

39. The apparatus of claim 36, wherein the gimbal is capable of transmitting at least 90° off a boresight.

40. The apparatus of claim 30, wherein the gimbaled LADAR sensor is capable of transmitting at least 90° off a boresight.

41. The apparatus of claim 30, wherein the apparatus is a vehicle.

42. The apparatus of claim 36, wherein the vehicle is an airborne vehicle.

* * * * *